United States Patent
Byun et al.

(10) Patent No.: US 9,490,468 B2
(45) Date of Patent: Nov. 8, 2016

(54) SECONDARY BATTERY

(71) Applicants: Sangwon Byun, Yongin-si (KR); Haekwon Yoon, Yongin-si (KR); Minyeol Han, Yongin-si (KR)

(72) Inventors: Sangwon Byun, Yongin-si (KR); Haekwon Yoon, Yongin-si (KR); Minyeol Han, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 681 days.

(21) Appl. No.: 13/673,082

(22) Filed: Nov. 9, 2012

(65) Prior Publication Data

US 2013/0266830 A1   Oct. 10, 2013

(30) Foreign Application Priority Data

Apr. 6, 2012 (KR) .................. 10-2012-0036292

(51) Int. Cl.
*H01M 2/34* (2006.01)
*H01M 2/26* (2006.01)
*H01M 10/04* (2006.01)
*H01M 10/42* (2006.01)
*H01M 10/44* (2006.01)
*H01M 2/02* (2006.01)
*H01M 2/04* (2006.01)

(52) U.S. Cl.
CPC ............... *H01M 2/34* (2013.01); *H01M 2/263* (2013.01); *H01M 2/345* (2013.01); *H01M 10/0431* (2013.01); *H01M 10/42* (2013.01); *H01M 10/445* (2013.01); *H01M 2/021* (2013.01); *H01M 2/0426* (2013.01); *H01M 2200/103* (2013.01); *H01M 2200/20* (2013.01)

(58) Field of Classification Search
CPC ......... H01M 2200/20; H01M 2/3345; H01M 10/4235; H01M 2/12
See application file for complete search history.

(56) References Cited

U.S. PATENT DOCUMENTS 6,274,264 B1 * 8/2001 Azema ........................... 429/53
2010/0035126 A1   2/2010 Breault
2010/0035129 A1   2/2010 Rigobert (Continued)

FOREIGN PATENT DOCUMENTS

CN   101573805 A   11/2009
CN   102088103 A   6/2011

(Continued)

OTHER PUBLICATIONS

European Search Report dated Jul. 19, 2013.
(Continued)

*Primary Examiner* — Ula C Ruddock
*Assistant Examiner* — Lisa S Park
(74) *Attorney, Agent, or Firm* — Lee & Morse, P.C.

(57) ABSTRACT

A secondary battery, including an electrode assembly including a first electrode plate, a second electrode plate, and a separator between the first and second electrode plates, a first collector electrically connected to the first electrode plate, and having a fuse region, a case accommodating the electrode assembly and the first collector, a cap plate coupled with the case, and having a short circuit hole, a first short circuit member in the short circuit hole, a second short circuit member spaced apart from a top surface of the cap plate and facing the first short circuit member, the second short circuit member being electrically connected to the second electrode plate, and an induction member inducing gas generated from inside the case to move to the first short circuit member.

18 Claims, 6 Drawing Sheets

(56) References Cited

U.S. PATENT DOCUMENTS

2010/0247987 A1* 9/2010 Holung et al. .................. 429/62
2010/0247989 A1* 9/2010 Kim ................................ 429/94
2011/0104528 A1* 5/2011 Byun et al. ..................... 429/61
2011/0135976 A1* 6/2011 Byun .............................. 429/56
2011/0183193 A1   7/2011 Byun et al.

FOREIGN PATENT DOCUMENTS

| EP | 0867960 | A1 | 9/1998 |
|---|---|---|---|
| EP | 2088635 | A1 | 8/2009 |
| KR | 10-2011-0047610 | | 5/2011 |
| KR | 10-2011-0065277 | | 6/2011 |
| KR | 10-1042808 | | 6/2011 |

OTHER PUBLICATIONS

Chinese Office Action dated Mar. 28, 2016 in corresponding Chinese Patent Application No. 201210488386.6, Byun, et al.
Korean Office Action dated Feb. 5, 2016 in Corresponding Korean Patent Application No. 10-2012-0036292.

* cited by examiner

SECONDARY BATTERY

BACKGROUND

1. Field

Embodiments relate to a secondary battery.

2. Description of the Related Art

Secondary batteries may be rechargeable batteries and primary batteries may be non-rechargeable. A low capacity secondary battery may include a battery cell in the form of a pack and may be used in portable small electronic devices such as, e.g., cellular phones and camcorders. A high capacity secondary battery may include tens of battery packs that are connected to one another, and may be used as a power source for driving a motor, e.g., of a hybrid vehicle.

SUMMARY

Embodiments are directed to a secondary battery, including: an electrode assembly including a first electrode plate, a second electrode plate, and a separator between the first and second electrode plates, a first collector electrically connected to the first electrode plate, and having a fuse region, a case accommodating the electrode assembly and the first collector, a cap plate coupled with the case, and having a short circuit hole, a first short circuit member in the short circuit hole, a second short circuit member spaced apart from a top surface of the cap plate and facing the first short circuit member, the second short circuit member being electrically connected to the second electrode plate, and an induction member inducing gas generated from inside the case to move to the first short circuit member.

The induction member may include a first opening at a first side of the induction member and a second opening at a second side of the induction member, and the induction member may be provided in a duct form.

The secondary battery as claimed in claim 2, wherein the first side of the induction member is connected to the first collector such that the first opening is oriented to the fuse region.

The second opening at the second side of the induction member may be oriented to the first short circuit member, and may be spaced apart from the first short circuit member and a bottom surface of the cap plate.

The second side of the induction member may protrude toward the first short circuit member.

The second side of the induction member may protrude such that the second opening is oriented to the first short circuit member, and is connected to a bottom surface of the cap plate, and a projection part of the second side may include at least one third opening communicating with an inner space of the case.

The fuse region may have a smaller cross section than a cross section of other regions of the first collector.

The first short circuit member may be spaced from the second short circuit member such that, when a pressure greater than a preset pressure is applied to the first short circuit member, the first short circuit member electrically contacts the second short circuit member.

The induction member may induce gas generated from the fuse region to move through the induction member to the first short circuit member, such that the gas applies a pressure to the first short circuit member.

The first electrode plate may be electrically connected to the case and the first short circuit member.

Embodiments are also directed to a secondary battery, including a case, an electrode assembly in the case, the electrode assembly including a first electrode, a second electrode, and a separator between the first and second electrode, a cap plate coupled with the case, the cap plate having a short circuit hole, a first short circuit member in the short circuit hole, the first short circuit member electrically connected to the first electrode, a second short circuit member spaced from the first short circuit member, the second short circuit member electrically connected to the second electrode, and an induction member inducing gas generated from inside the case to move to the first short circuit member.

The induction member may have the form of a duct with a first opening and a second opening.

The secondary battery may further include a collector having a fuse region, and the first opening may be oriented to receive gas generated in the fuse region.

The second opening may be oriented to direct gas carried by the duct toward the first short circuit member, and the second opening may be spaced apart from the first short circuit member and a bottom surface of the cap plate.

The second opening may be located on a protrusion of the induction member, the protrusion protruding toward the first short circuit member.

The second opening may be oriented to direct gas carried by the duct toward the first short circuit member, the second opening may be located on a protrusion of the induction member, and the protrusion may be connected to a bottom surface of the cap plate and may include a third opening communicating with an inner space of the case.

The first short circuit member may be spaced from the second short circuit member such that, when a pressure applied to the first short circuit member is greater than a preset pressure, the first short circuit member electrically contacts the second short circuit member.

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2012-0036292, filed on Apr. 6, 2012, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions may be exaggerated for clarity of illustration. It will also be understood that when an element is referred to as being "on" another element, it can be directly on the other element, or intervening elements may also be present. Further, it will be understood that when an element is referred to as being "between" two elements, it can be the only element therebetween, or one or more intervening elements may also be present. Like reference numerals refer to like elements throughout.

Figure 1:
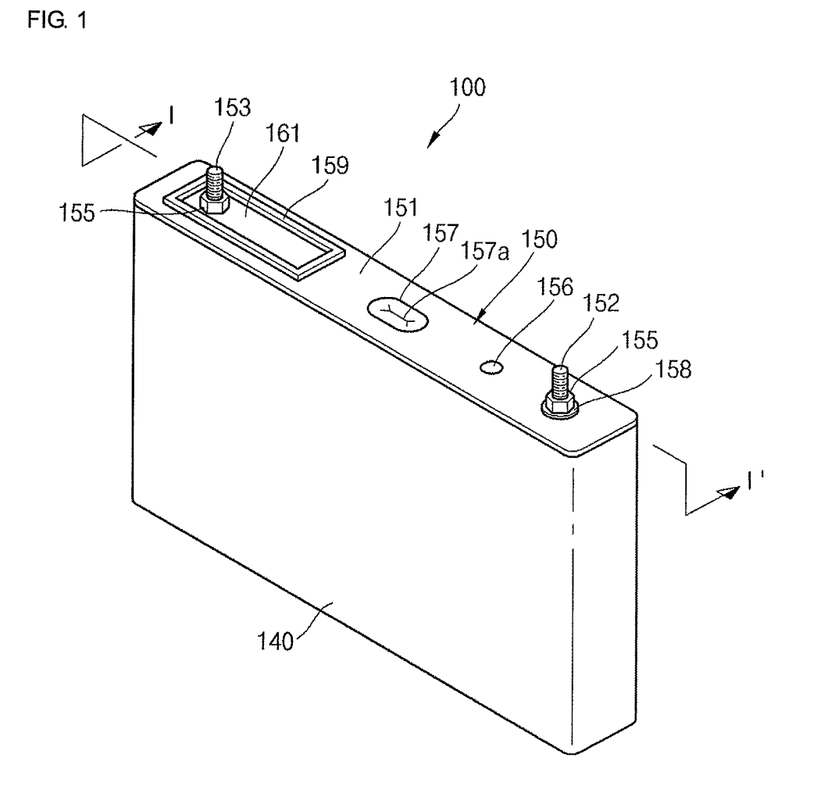
FIG. 1 illustrates a perspective view of a secondary battery according to an embodiment.
Figure 2:
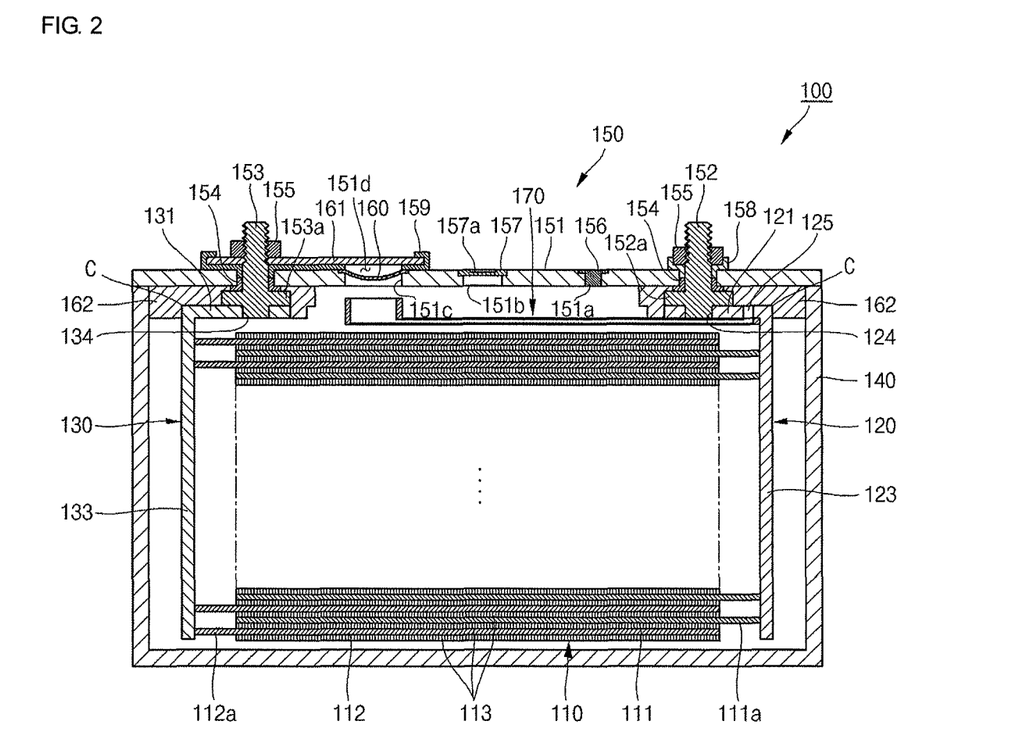
FIG. 2 illustrates a cross-sectional view taken along line I-I' of FIG. 1.

FIG. 1 is a perspective view illustrating a secondary battery 100 according to an embodiment. FIG. 2 is a cross-sectional view taken along line I-I' of FIG. 1.

Referring to FIGS. 1 and 2, the secondary battery 100 may include an electrode assembly 110, a first collector 120, a second collector 130, a case 140, a cap assembly 150, a first short circuit member 160, a second short circuit member 161, and an induction member 170.

The electrode assembly 110 may be formed by, e.g., winding or stacking a first electrode plate 111, a separator 113, and a second electrode plate 112, which may have, e.g., a thin plate or film shape. The first electrode plate 111 may function as a positive electrode, and the second electrode plate 112 may function as a negative electrode.

The first electrode plate 111 may be formed by applying a first electrode active material (e.g., a transition metal oxide) on a first electrode collector formed of metal foil (e.g., aluminum foil), and may include a first electrode non-coating portion 111*a* on which the first electrode active metal is not applied. The first electrode non-coating portion 111*a* may function as a passage for a current flowing between the first electrode plate 111 and the outside of the first electrode plate 111. A material used to form the first electrode plate 111 may be a suitable material.

The second electrode plate 112 may be formed by applying a second electrode active material (e.g., graphite or carbon) on a second electrode collector formed of metal foil (e.g., nickel or copper foil), and may include a second electrode non-coating portion 112*a* on which the second electrode active metal is not applied. The second electrode non-coating portion 112*a* may function as a passage for a current flowing between the second electrode plate 112 and the outside of the second electrode plate 112. A material used to form the second electrode plate 112 may be a suitable material.

The first and second electrode plates 111 and 112 may change their poles with each other.

The separator 113 may be disposed between the first electrode plate 111 and the second electrode plate 112 to prevent short circuiting and to allow the movement of e.g., lithium ions, and may be formed of e.g., polyethylene, polypropylene, or a combined film of polypropylene and polyethylene. A material used to form the separator 113 may be a suitable material.

Both ends of the electrode assembly 110 may be coupled with the first and second collectors 120 and 130 that may be respectively electrically connected to the first and second electrode plates 111 and 112.

The first collector 120 may be formed of a conductive material (e.g., aluminum or an aluminum alloy), and may contact the first electrode non-coating portion 111*a* protruding from an end of the electrode assembly 110, thereby being electrically connected to the first electrode plate 111. The first collector 120 may include a first connecting part 121, a first extension 123, a first terminal hole 124, and a first fuse hole 125. The configuration of the first collector 120 will be described later in greater detail.

The second collector 130 may be formed of a conductive material (e.g., copper, a copper alloy, nickel, or a nickel alloy), and may contact the second electrode non-coating portion 112*a* protruding from another end of the electrode assembly 110, thereby being electrically connected to the second electrode plate 112. The second collector 130 may include a second connecting part 131, a second extension 133, and a second terminal hole 134. The configuration of the second collector 130 will be described later in greater detail.

The case 140 may be formed of a conductive metal (e.g., aluminum, aluminum alloy, or steel plated with nickel), and may have a substantially hexahedron shape with an opening through which the electrode assembly 110, the first collector 120, and the second collector 130 may be inserted and placed. The case 140 and the cap assembly 150 are illustrated in FIG. 2 as being assembled such that the cap assembly 150 is located in the opening. The inner surface of the case 140 may be treated to be insulated from the electrode assembly 110, the first and second collectors 120 and 130, and the cap assembly 150. For example, the case 140 may have a pole such as the positive pole.

The cap assembly 150 may be coupled to the case 140. The cap assembly 150 may include a cap plate 151, a first electrode terminal 152, a second electrode terminal 153, a plurality of gaskets 154, and a plurality of nuts 155. The cap assembly 150 may also include a plug 156, a vent plate 157, a connecting plate 158, an upper insulating member 159, the first short circuit member 160, the second short circuit member 161, and a plurality of lower insulating members 162.

The cap plate 151 may close the opening of the case 140, and may be formed of the same material as that of the case 140. The cap plate 151 may have the same pole as that of the case 140.

The first electrode terminal 152 may pass through a side part of the cap plate 151 and may be electrically connected to the first collector 120. The first electrode terminal 152 may be formed in a column shape, and may include an upper column exposed to the upper side of the cap plate 151, and a lower column disposed below the cap plate 151. A screw thread may be formed on the outer circumferential surface of the upper column. The lower column may include a flange 152*a* to prevent the removal of the first electrode terminal 152 from the cap plate 151. A part of the first electrode terminal 152 below the flange 152*a* may be fitted in the first terminal hole 124 of the first collector 120. The first electrode terminal 152 may be electrically connected to the cap plate 151.

The second electrode terminal 153 may pass through another side part of the cap plate 151 and may be electrically connected to the second collector 130. Since the second electrode terminal 153 may be in the same in shape as the first electrode terminal 152, a description thereof will be not be repeated (in FIG. 2, the flange of the second electrode terminal is referenced as 153*a*). The second electrode terminal 153 may be insulated from the cap plate 151, whereas the first electrode terminal 152 may be electrically connected to the cap plate 151.

Each of the gaskets 154 may be formed of an insulating material, and may be disposed between the cap plate 151 and each of the respective first and second electrode terminals 152 and 153 to seal the space between the cap plate 151 and each of the respective first and second electrode terminals 152 and 153. The gaskets 154 may prevent the introduction of moisture into the secondary battery 100, or the leakage of the electrolyte from the secondary battery 100.

The nuts 155 may be coupled to the respective first and second electrode terminals 152 and 153 along screw threads formed thereon, and may fix the respective first and second electrode terminals 152 and 153 to the cap plate 151.

The plug 156 may close an electrolyte injection hole 151a of the cap plate 151. The vent plate 157 may be installed in the vent hole 151b of the cap plate 151 and may have a notch 157a, which may be opened at a set pressure.

The connecting plate 158 may be disposed between the first electrode terminal 152 and the cap plate 151, and may be caused to tightly contact the cap plate 151 and the gasket 154 by the nut 155. The first electrode terminal 152 may be fitted in the connecting plate 158. The connecting plate 158 may electrically connect the first electrode terminal 152 to the cap plate 151.

The upper insulating member 159 may be disposed between the second electrode terminal 153 and the cap plate 151, and may be tightly contact the cap plate 151 and the gasket 154. The second electrode terminal 153 may be fitted in the upper insulating member 159. The upper insulating member 159 may insulate the second electrode terminal 153 and the cap plate 151 from each other.

Each of the lower insulating members 162 may be disposed between the cap plate 151 and each of the respective first and second collectors 120 and 130 to prevent unnecessary short circuiting.

The first short circuit member 160 may be installed in a short circuit hole 151c of the cap plate 151, and may have the same pole as that of the cap plate 151. The first short circuit member 160 may include a reversible plate that may include a round part convex downward, and an edge part fixed to the cap plate 151.

When the inner pressure of the secondary battery 100 is greater than a set pressure (e.g., by overcharging or external short circuiting), the first short circuit member 160 may be reversed and may protrude upward. That is, the inner pressure of the secondary battery 100 may cause the shape of the first short circuit member 160 to be convex upward. The external short circuiting may mean that the first and second electrode terminals 152 and 153 exposed to the outside of the case 140 form a short circuit with an external conductive material.

The second short circuit member 161 may be disposed outside the cap plate 151, and may be spaced apart therefrom. The second short circuit member 161 may also be spaced from the first short circuit member 160 by a space 151d. That is, the second short circuit member 161 may be disposed on the upper insulating member 159, and may extend to cover the short circuit hole 151c. The second electrode terminal 153 may be fitted in the second short circuit member 161. The second short circuit member 161 may be electrically connected to the second electrode terminal 153. When the inner pressure of the secondary battery 100 is greater than a set pressure (e.g., by overcharging or external short circuiting), the first short circuit member 160 may be reversed and may protrude upward to contact the second short circuit member 161, such that the second short circuit member 161 and the first short circuit member 160 form a short circuit.

When the secondary battery 100 is over charged, the first short circuit member 160 may be reversed to form a short circuit with the second short circuit member 161. In this case, a high current may flow through the secondary battery 100, and heat may be generated therefrom. The generated heat may cut off a fuse region of the first collector 120, to thereby electrically disconnect the secondary battery 100 (e.g., such that the first terminal 152 is no longer electrically connected to the first electrode plates 111).

When external short circuiting occurs, the second electrode terminal 153, the second collector 130, the electrode assembly 110, the first collector 120, and the first electrode terminal 152 may form a first current path. At this point, the fuse region of the first collector 120 melts, an electric arc is generated, and gas is generated by the electric arc. The induction member 170 induces the gas generated from the fuse region to move more efficiently (e.g., directly) to the first short circuit member 160, so that the pressure of the gas may be rapidly concentrated on the first short circuit member 160. The configuration of the induction member 170 will be described later in greater detail.

When the pressure of the gas supplied by the induction member 170 is equal to or greater than a certain value, the first short circuit member 160 may be reversed to form a short circuit with the second short circuit member 161. Accordingly, the secondary battery 100 may have not only the first current path but also a second current path which may be formed by the second electrode terminal 153, the second short circuit member 161, the first short circuit member 160, and the case 140. In this case, the amount of current concentrated on the fuse region of the first collector 120 may be decreased to remove the electric arc.

For example, if external short circuiting occurs without the induction member 170, although arc gas increases the inner pressure of the case 140, a propagation time of an electric arc generated in the fuse region of the first collector 120 may be shorter than a time taken for operating the first short circuit member 160. Thus, the first short circuit member 160 may fail to operate. That is, if the first collector 120 is electrically connected to the case 140, the electric arc generated in the first collector 120 may propagate to the case 140 and may form a hole therein. Arc gas may be discharged from the case 140 through the hole, and the pressure required for normally operating the first short circuit member 160 (e.g., reversing the first short circuit member 160) may not be obtained.

Thus, the induction member 170 quickly induces the formation of a short circuit between the first short circuit member 160 and the second short circuit member 161 so as to remove an initial electric arc generated by external short circuiting before the initial arc propagates to another portion of the secondary battery 100, thereby improving the safety of the secondary battery 100.

Figure 3A:
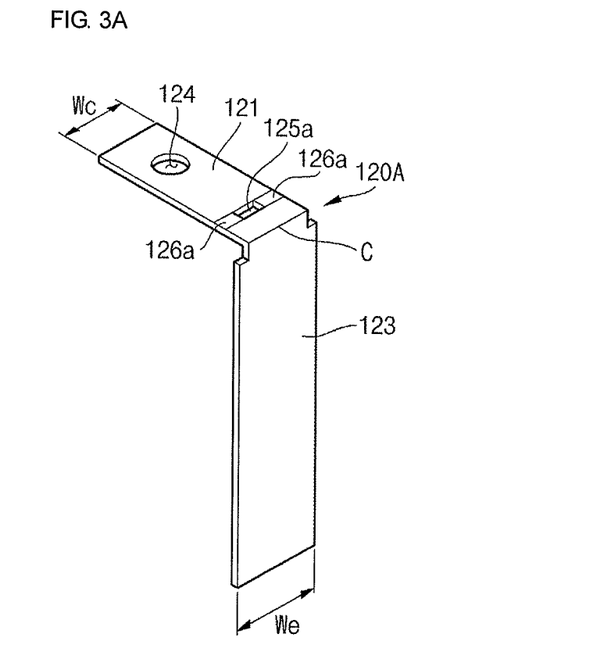
FIG. 3A illustrates a perspective view of a first collector and a first fuse region of the first collector according to an embodiment.
Figure 3B:
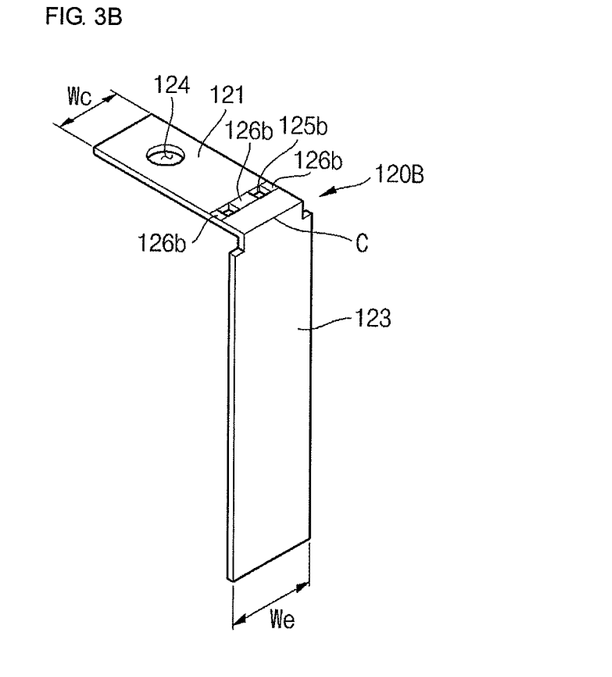
FIG. 3B illustrates a perspective view of a first collector and a second fuse region of the first collector according to an embodiment.
Figure 3C:
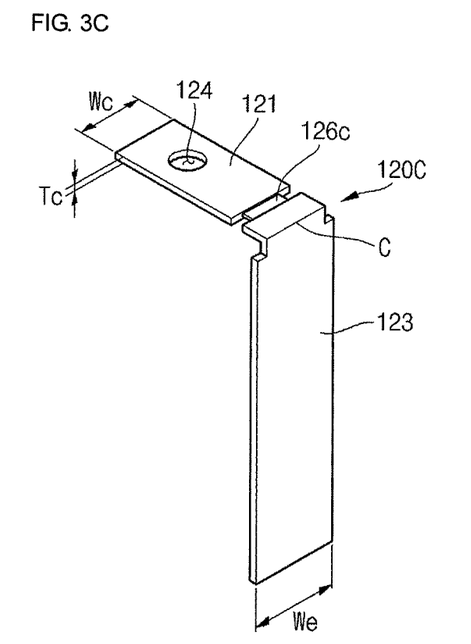
FIG. 3C illustrates a perspective view of a first collector and a third fuse region of the first collector according to an embodiment.

Hereinafter, a more detailed description of the first collector and fuse region of the first collector will be provided with reference to the accompanying drawings. In particular, first collectors 120A, 120B, and 120C, and first to third fuse regions 126a, 126b, 126c corresponding thereto, will described as examples according to various embodiments.

FIG. 3A is a perspective view illustrating the first collector 120A and the first fuse region 126a of the first collector 120A according to an embodiment.

Referring to FIG. 3A, the first collector 120A may include a first connecting part 121 and a second connecting part 123.

The first connecting part 121 of the first collector 120A may be provided in the form of a plate between the upper side of an electrode assembly 110 and the lower side of the cap assembly 150. The first connecting part 121 may have a connection width Wc. The first fuse region 126a may be disposed in a side portion of the first connecting part 121, and a first terminal hole 124 may be disposed in another side portion thereof. The side portion of the first connecting part 121 where the first terminal hole 124 is disposed may not overlap the first fuse region 126a (e.g., the first terminal hole 124 may be on an opposite side portion of the first connecting part 121 than the side portion of the first fuse region 126a), and a first electrode terminal 152 of the cap assembly 150 may be fitted in the first terminal hole 124.

A first fuse hole 125a may be disposed in the first fuse region 126a of the first connecting part 121. Since the first fuse region 126a has the first fuse hole 125a, the first fuse region 126a may have a smaller cross section (e.g., a smaller cross section than the rest of the regions of the first collector 120A except for the region including the first terminal hole 124). The first fuse hole 125a may have a suitable shape (e.g., a tetragonal shape that is elongated along the width direction of the first connecting part 121), and the first fuse hole 125a may be provided in plurality. As such, since the first fuse region 126a may have the first fuse hole 125a, the first fuse region 126a may have a smaller cross section than the cross section of the other regions of the first collector 120A. Thus, if a large amount of current (e.g., due to short circuiting) flows through the first collector 120A, heat may be generated and may melt the first fuse region 126a so as to block a current flow between the electrode assembly 110 and each of a case 140 and a cap plate 151 (including the first terminal 152). In this case, short circuiting may be caused by an external conductive material penetrating a secondary battery 100 through the case 140 or the cap plate 151 functioning as a positive electrode.

The first extension 123 may be extended from an end of the first connecting part 121 in different direction than the first connecting part 121 (e.g., the first extension 123 and the first connecting part 121 may be bent), and may be provided in the form of a plate to substantially contact a first electrode non-coating portion 111a. The first extension 123 may have an extension width We that is greater than the connection width Wc. Thus, when the inner pressure of the secondary battery 100 is equal to or greater than a set pressure, gas from the secondary battery 100 may be efficiently moved through an opening of the vent plate 157. The first connecting part 121 may be connected to the first extension 123 at a corner C. The first connecting part 121 may be perpendicular to the first extension 123 at the corner C.

Although the first fuse region 126a may be disposed in the first connecting part 121 in FIG. 3A, the first fuse region 126a may be disposed in a region of the first extension 123, e.g., in a region closest to the corner C (e.g., such that the first fuse region 126a does not contact electrolyte).

FIG. 3B is a perspective view illustrating the first collector 120B and the second fuse region 126b of the first collector 120B according to an embodiment.

The first collector 120B may be the same as the first collector 120A except for the second fuse region 126b. Since the first collector 120B may have a plurality of second fuse holes 125b, the second fuse region 126b may have a smaller cross section (e.g., a smaller cross section than the rest of the first collector 120B except for a region including a first terminal hole 124).

FIG. 3C is a perspective view illustrating the first collector 120C and the third fuse region 126c of the first collector 120C according to an embodiment.

The first collector 120C may be the same as the first collectors 120A and 120B except for the third fuse region 126c. The third fuse region 126c may be provided in a lead form, and may have a smaller cross section (e.g., a smaller cross section than the rest of the first collector 120C except for a region including a first terminal hole 124). To this end, the third fuse region 126c may have a width smaller than a width of the first collector 120C, e.g., than a connection width Wc, or may have a thickness smaller than a thickness of the first collector 120C, e.g., than a connection thickness Tc. Alternatively, the third fuse region 126c may have a width smaller than the connection width Wc, and a thickness smaller than the connection thickness Tc.

Figure 4:
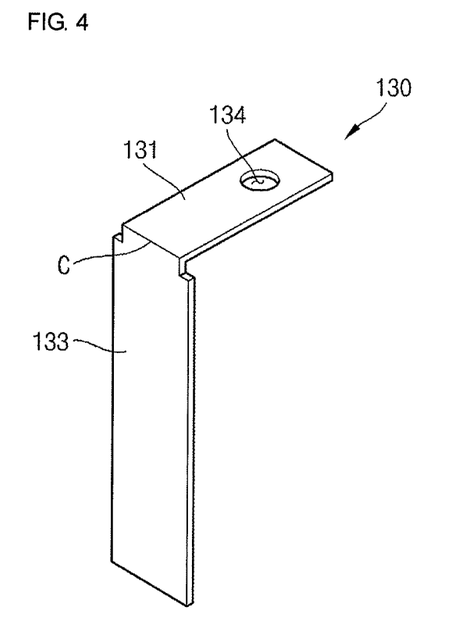
FIG. 4 illustrates a perspective view of a second collector according to an embodiment.

FIG. 4 is a perspective view illustrating the second collector 130 according to an embodiment.

Referring to FIG. 4, the second collector 130 may include the second connecting part 131 and the second extension 133.

The second connecting part 131 may be provided in the form of a plate between the upper side of the electrode assembly 110 and the lower side of the cap assembly 150. The second connecting part 131 may have a connection width Wc. The second terminal hole 134 may be disposed in the second connecting part 131. The second electrode terminal 153 of the cap assembly 150 may be fitted in the second terminal hole 134.

The second extension 133 may be extended from an end of the second connecting part 131 in different direction than the second connecting part 131 (e.g., the second extension 133 and the second connecting part 131 may be bent), and may be provided in the form of a plate to substantially contact the second electrode non-coating portion 112a. The second extension 133 may have an extension width We that is greater than the connection width Wc. The second connecting part 131 may be connected to the second extension 133 at a corner C. The second connecting part 131 may be perpendicular to the second extension 133 at the corner C.

Figure 5A:
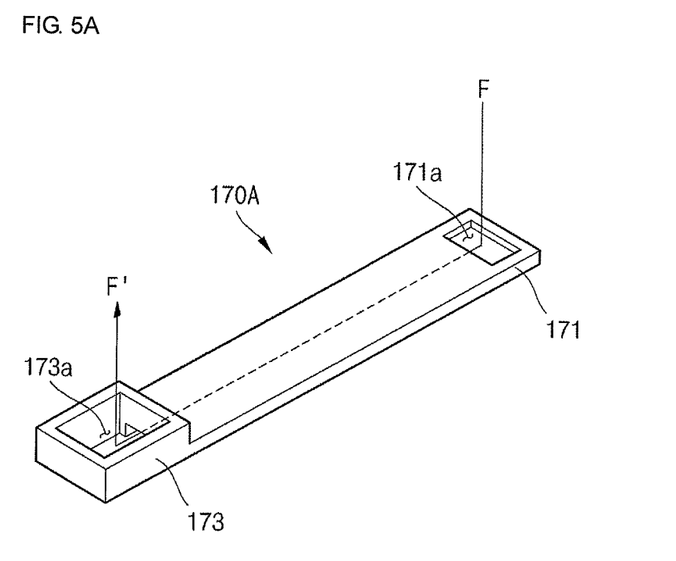
FIG. 5A illustrates a perspective view of a first induction member according to an embodiment.
Figure 5B:
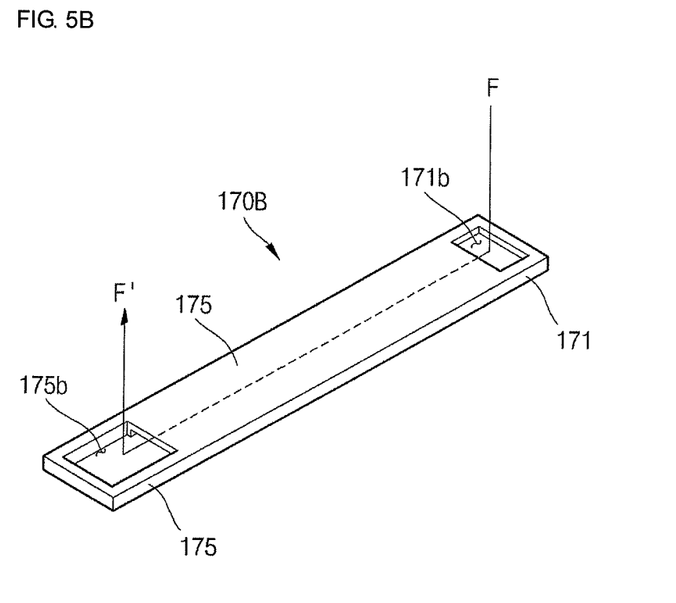
FIG. 5B illustrates a perspective view of a second induction member according to an embodiment.
Figure 5C:
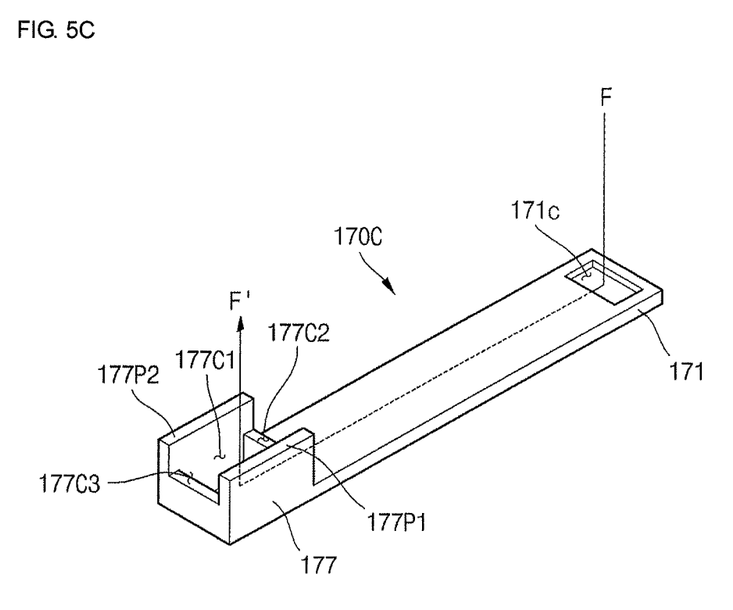
FIG. 5C illustrates a perspective view of a third induction member according to an embodiment.

Hereinafter, a more detailed description of the induction member 170 will be provided with reference to the accompanying drawings. First to third induction members 170A, 170B, and 170C according to various embodiments are exemplified as the induction member 170.

FIG. 5A is a perspective view illustrating the first induction member 170A according to an embodiment.

Referring to FIG. 5A, the first induction member 170A may include a first opening part 171a at a side part 171, and a second opening part 173a at a side part 173, and may be provided in the form of a duct.

The side part 171 may be connected to the first collector 120 such that the first opening part 171a is oriented to the fuse region 126a, 126b, or 126c. The first opening part 171a may be oriented to the fuse region 126a, 126b, or 126c such that substantially all of the gas generated by the fuse region flows into the first opening part 171a. That is, as illustrated in FIG. 2, the first fuse hole 125 may be surrounded on two sides by the first collector 120, on a third side by the lower insulating members 162, and on the fourth side by the first opening part of the induction member 170.

The second opening part 173a of the side part 173 may be oriented to the first short circuit member 160, and may extend and protrude toward the first short circuit member 160. The first induction member 170A may have no other openings between the first opening part 171a and the second opening part 173a. Thus, gas generated from the fuse region 126a, 126b, or 126c may be moved from a location F where the fuse region 126a, 126b, or 126c is disposed, to a location F' where the first short circuit member 160 is disposed, through the first induction member 170A. Since the side part 173 may have a protruding structure, the pressure of arc gas may be more efficiently concentrated on the first short circuit member 160. The side part 173 may be spaced a certain distance from the first short circuit member 160 and the bottom surface of the cap plate 151. When the secondary battery 100 is over charged, the inner pressure of the secondary battery 100 may increased to operate the first short circuit member 160. To this end, the side part 173 may be spaced apart from the cap plate 151 so as to form a space through which the inner space of the case 140 communicates with the first short circuit member 160.

The first induction member 170A may be disposed between the electrode assembly 110 and the cap plate 151. Thus, the first induction member 170A may prevent the electrode assembly 110 from moving within the case 140. Since the first induction member 170A may be disposed within the minimum distance between the first short circuit member 160 and the fuse region 126a, 126b, or 126c of the first collector 120, when external short circuiting occurs, the first induction member 170A can operate the first short circuit member 160 more quickly.

FIG. 5B is a perspective view illustrating the second induction member 170b according to an embodiment.

Referring to FIG. 5B, the second induction member 170B may include a first opening part 171b at a side part 171, and a second opening part 175b at a side part 175, and be provided in the form of a duct.

The side part 171 may be connected to the first collector 120 such that the first opening part 171b is oriented to the fuse region 126a, 126b, or 126c. The first opening part 171b may be oriented to the fuse region 126a, 126b, or 126c such that substantially all of the gas generated by the fuse region flows into the first opening part 171b. That is, as illustrated in FIG. 2, the first fuse hole 125 may be surrounded on two sides by the first collector 120, on a third side by the lower insulating members 162, and on the fourth side by the first opening part of the induction member 170.

The second opening part 175b of the side part 175 may be oriented to the first short circuit member 160. The second induction member 170B may have no other openings between the first opening part 171b and the second opening part 175b. Thus, gas generated from the fuse region 126a, 126b, or 126c may be moved from the location F where the fuse region 126a, 126b, or 126c is disposed, to the location F' where the first short circuit member 160 is disposed, through the second induction member 170B. The side part 175 of the second induction member 170B may have a flat structure, and may not project upwards. The side part 175 of the second induction member 170B may be spaced a certain distance from the first short circuit member 160 and the bottom surface of the cap plate 151, like the side part 173 of the first induction member 170A. Since the space between the second opening part 175B and the first short circuit member 160 (e.g., the space through which the inner space of the case 140 communicates with the first short circuit member 160) may be greater than that of the first induction member 170A, the second induction member 170B may increases the sensitivity of the first short circuit member 160 to overcharging.

FIG. 5C is a perspective view illustrating the third induction member 170C according to an embodiment.

Referring to FIG. 5C, the third induction member 170C may include a first opening part 171c at a side part 171, a second opening part 177C1, and a plurality of third opening parts 177C2 and 177C3 at a side part 175, and may be provided in the form of a duct.

The side part 171 may be connected to the first collector 120 such that the first opening part 171C1 is oriented to the fuse region 126a, 126b, or 126c. The first opening part 171C1 may be oriented to the fuse region 126a, 126b, or 126c such that substantially all of the gas generated by the fuse region flows into the first opening part 171C1. That is, as illustrated in FIG. 2, the first fuse hole 125 may be surrounded on two sides by the first collector 120, on a third side by the lower insulating members 162, and on the fourth side by the first opening part of the induction member 170.

The side part 177 may have a protruding structure such that the second opening part 177C1 is oriented to the first short circuit member 160. The third induction member 170C may have no other openings between the first opening part 171c and the second opening part 177C1. Thus, gas generated from the fuse region 126a, 126b, or 126c may be moved from the location F where the fuse region 126a, 126b, or 126c is disposed, to the location F' where the first short circuit member 160 is disposed, through the third induction member 170C. The third opening parts 177C2 and 177C3 may be disposed in side surfaces of the side part 177, but the positions thereof are not limited thereto. At least one of the third opening parts 177C2 and 177C3 may provide a space through which the inner space of the case 140 communicates with the first short circuit member 160. The third opening parts 177C2 and 177C3 may define projection parts 177P1 and 177P2 that protrude from the side part 177. The projection parts 177P1 and 177P2 may be connected to the bottom surface of the cap plate 151, so that the side part 177 can be fixed to the cap plate 151.

Any one of the first to third induction members 170A, 170B, and 170C may be disposed between the electrode assembly 110 and the cap plate 151. Thus, the thickness and width of the first to third induction members 170A, 170B, and 170C may be designed not to affect the entire size of the secondary battery 100, which may be a suitable size.

By way of summary and review, secondary batteries may be manufactured to have various shapes such as, e.g., a cylindrical shape and a prismatic shape. Electrolyte and an electrode assembly (which may be formed by interposing a separator as an insulator between a positive electrode plate and a negative electrode plate) may be installed in a case, and a cap assembly (which may be provided with electrode terminals) may be installed on the case, so as to form a secondary battery.

External short circuiting may melt a fuse region of a secondary battery, which may generate an electric arc. Such an electric arc may propagate to other regions of a secondary battery than a fuse region, thereby resulting in an accident such as ignition or explosion. In contrast, the secondary battery of the embodiments disclosed herein may have a high safety against external short circuiting.

According to an embodiment of the present invention, a secondary battery has high safety against overcharging and external short circuiting.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly including a first electrode plate, a second electrode plate, and a separator between the first and second electrode plates;
a first collector electrically connected to the first electrode plate, and having a fuse region;
a case accommodating the electrode assembly and the first collector;
a cap plate coupled with the case, and having a short circuit hole;
a first short circuit member in the short circuit hole;
a second short circuit member spaced apart from a top surface of the cap plate and facing the first short circuit member, the second short circuit member being electrically connected to the second electrode plate; and
an induction member inducing substantially all gas generated from the fuse region to move to the first short circuit member by being directly connected to the first collector,
wherein:
the induction member includes a first opening at a first side thereof,
the fuse region includes an opening in the first collector, and
the opening of the fuse region opens only into the first opening of the induction member.

2. The secondary battery as claimed in claim 1, wherein:
the induction member includes a second opening at a second side of the induction member, and
the induction member is provided in a duct form.

3. The secondary battery as claimed in claim 2, wherein the first side of the induction member is directly connected to the first collector such that the first opening is oriented to the fuse region.

4. The secondary battery as claimed in claim 2, wherein the second opening at the second side of the induction member is oriented to the first short circuit member, and is spaced apart from the first short circuit member and a bottom surface of the cap plate.

5. The secondary battery as claimed in claim 4, wherein the second side of the induction member protrudes toward the first short circuit member.

6. The secondary battery as claimed in claim 2, wherein:
the second side of the induction member protrudes such that the second opening is oriented to the first short circuit member, and is directly connected to a bottom surface of the cap plate, and
a projection part of the second side includes at least one third opening communicating with an inner space of the case.

7. The secondary battery as claimed in claim 1, wherein the fuse region has a smaller cross sectional width than a cross sectional width of other regions of the first collector.

8. The secondary battery as claimed in claim 1, wherein the first short circuit member is spaced from the second short circuit member such that, when a pressure greater than a preset pressure is applied to the first short circuit member, the first short circuit member electrically contacts the second short circuit member.

9. The secondary battery as claimed in claim 1, wherein the first electrode plate is electrically connected to the case and the first short circuit member.

10. A secondary battery, comprising:
a case;
an electrode assembly in the case, the electrode assembly including a first electrode, a second electrode, and a separator between the first and second electrodes;
a collector having a fuse region;
a cap plate coupled with the case, the cap plate having a short circuit hole;
a first short circuit member in the short circuit hole, the first short circuit member electrically connected to the first electrode;
a second short circuit member spaced from the first short circuit member, the second short circuit member electrically connected to the second electrode; and
an induction member inducing substantially all gas generated from the fuse region to move to the first short circuit member by being directly connected to the collector,
wherein:
the induction member includes a first opening at a first side thereof,
the fuse region includes an opening in the collector, and
the opening of the fuse region opens only into the first opening of the induction member.

11. The secondary battery as claimed in claim 10, wherein the induction member has the form of a duct with the first opening and a second opening.

12. The secondary battery as claimed in claim 11, wherein the collector is electrically connected to the first or second electrodes, wherein the first opening is oriented to receive substantially all gas generated in the fuse region.

13. The secondary battery as claimed in claim 12, wherein the second opening is oriented to direct substantially all gas carried by the duct toward the first short circuit member, the second opening being spaced apart from the first short circuit member and a bottom surface of the cap plate.

14. The secondary battery as claimed in claim 13, wherein the second opening is located on a protrusion of the induction member, the protrusion protruding toward the first short circuit member.

15. The secondary battery as claimed in claim 12, wherein:
the second opening is oriented to direct substantially all gas carried by the duct toward the first short circuit member, the second opening being located on a protrusion of the induction member, and
the protrusion is directly connected to a bottom surface of the cap plate and includes a third opening communicating with an inner space of the case.

16. The secondary battery as claimed in claim 10, wherein the first short circuit member is spaced from the second short circuit member such that, when a pressure applied to the first short circuit member is greater than a preset pressure, the first short circuit member electrically contacts the second short circuit member.

17. A secondary battery, comprising:
an electrode assembly including a first electrode plate, a second electrode plate, and a separator between the first and second electrode plates;
a first collector electrically connected to the first electrode plate, and having a fuse region;
a case accommodating the electrode assembly and the first collector;
a cap plate coupled with the case, and having a short circuit hole;
a first short circuit member in the short circuit hole;

a second short circuit member spaced apart from a top surface of the cap plate and facing the first short circuit member, the second short circuit member being electrically connected to the second electrode plate; and an induction member inducing gas generated from the fuse region to move to the first short circuit member, the induction member including a first opening at a first side of the induction member and a second opening at a second side of the induction member, the first side of the induction member being directly connected to the first collector such that the first opening directly underlies the fuse region, wherein:
the fuse region includes an opening in the first collector, and the opening of the fuse region opens only into the first opening of the induction member.

18. The secondary battery as claimed in claim 1, wherein the induction member induces a localized increase in pressure at the first short circuit member in response to melting of the fuse region.

* * * * *